(12) United States Patent
Larsen (10) Patent No.: US 11,330,121 B1
(45) Date of Patent: May 10, 2022

(54) DYNAMIC CAROUSEL FOR PRINTED OUTPUT REVIEW

(71) Applicant: Kara Larsen, Boulder, CO (US)

(72) Inventor: Kara Larsen, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/178,522

(22) Filed: Feb. 18, 2021

(51) Int. Cl.
*G06F 3/12* (2006.01)
*H04N 1/00* (2006.01)

(52) U.S. Cl.
CPC ....... *H04N 1/00477* (2013.01); *G06F 3/1204* (2013.01); *G06F 3/126* (2013.01); *G06F 3/1282* (2013.01); *H04N 1/0049* (2013.01); *H04N 1/00424* (2013.01)

(58) Field of Classification Search
None
See application file for complete search history.

(56) References Cited

U.S. PATENT DOCUMENTS

| | | | |
|---|---|---|---|
| 6,750,466 B2 * | 6/2004 | Guha ..................... | G01N 21/89 250/559.46 |
| 8,409,124 B2 | 4/2013 | Steffens et al. | |
| 8,472,073 B2 * | 6/2013 | Dennison ............... | B41J 29/393 358/1.14 |
| 8,779,924 B2 | 7/2014 | Pesot et al. | |
| 8,948,821 B2 | 2/2015 | Newham et al. | |
| 9,383,892 B2 | 7/2016 | Kandlikar et al. | |
| 9,544,447 B2 * | 1/2017 | Shijoh ................ | H04N 1/00328 |
| 9,592,921 B2 | 3/2017 | Dominic et al. | |
| 10,545,844 B2 * | 1/2020 | Dennison ............ | G06F 11/0733 |
| 11,094,048 B2 * | 8/2021 | Tsukamoto ............. | G06F 3/121 |
| 2006/0115127 A1 * | 6/2006 | Hatayama ............ | G06V 10/993 382/112 |
| 2020/0314279 A1 * | 10/2020 | Wakai ................ | H04N 1/00824 |

OTHER PUBLICATIONS

Babich, Nick; Designing a User-Friendly Homepage Carousel; UX Planet; https://uxplanet.ort/designing-a-user-friendly-homepage-carousel; Apr. 30, 2020.
Bootstrap Carousel Plugin; https://www.w3schools.com/bootstrap/bootstrap_carousel.asp; Jan. 31, 2021.
Williams, John Moore; Carousel/slider design best practices (with examples); https://webflow.com/blog/carousel-slider-design-best-practices; May 7, 2020.

* cited by examiner

*Primary Examiner* — Paul F Payer
(74) *Attorney, Agent, or Firm* — Duft & Bornsen, PC (57) ABSTRACT

Systems and methods are provided for reviewing images. One embodiment is a system in the form of an image review device that includes a display, an interface that receives images of print media marked by a printer, and a controller that generates notifications based upon the images, assigns the notifications to types based upon the images, and generates a Graphical User Interface (GUI) that presents the notifications via the display, wherein the GUI comprises a carousel that includes a detail area which presents a single notification at a time, a summary area that presents visual indicators that correspond with the notifications, and interactive elements for advancing the detail area to a next notification and for returning the detail area to a prior notification. The controller automatically controls at least one of a color or a shape of each visual indicator to indicate a type of a corresponding notification.

20 Claims, 7 Drawing Sheets

DYNAMIC CAROUSEL FOR PRINTED OUTPUT REVIEW

TECHNICAL FIELD

The following disclosure relates to the field of printing, and in particular, to analysis of printed output.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

In order to ensure that a print job has been printed at a desired level of quality, it is not uncommon for the output of a print job to be scanned. However, for print jobs that comprise thousands of pages, it is not feasible for a technician to manually review scans of those pages. Furthermore, a scanner may require its own maintenance and upkeep, for which a technician should be notified.

Thus, those who operate print shops continue to seek out enhanced systems and methods that permit the review of print jobs to be accomplished in an efficient and accurate manner.

SUMMARY

Embodiments described herein provide print review devices that dynamically generate a Graphical User Interface (GUI) which displays print notifications to print shop operators. The GUI includes a carousel having a detail area and a summary area. The detail area displays one notification at a time, while the summary area includes visual indicators that correspond with notifications that are accessible via the carousel. The visual indicators provide a technical benefit in that they are each colored and/or shaped to indicate the category or type of the notification that they represent. This enables a user to rapidly identify important notifications by looking at the visual indicators in the summary area of the carousel, without having to click through each notification in the carousel.

One embodiment is a system in the form of an image review device that includes a display, an interface that receives images of print media marked by a printer, and a controller that generates notifications based upon the images, assigns the notifications to types based upon the images, and generates a Graphical User Interface (GUI) that presents the notifications via the display, wherein the GUI comprises a carousel that includes a detail area which presents a single notification at a time, a summary area that presents visual indicators that correspond with the notifications, and interactive elements for advancing the detail area to a next notification and for returning the detail area to a prior notification. The controller automatically controls at least one of a color or a shape of each visual indicator to indicate a type of a corresponding notification.

A further embodiment is a method that includes receiving images of print media marked by a printer, generating notifications based upon the images, assigning the notifications to types based upon the images, and generating a Graphical User Interface (GUI) that presents the notifications via a display, wherein the GUI comprises a carousel that includes a detail area which presents a single notification at a time, a summary area that presents visual indicators that correspond with the notifications, and interactive elements for advancing the detail area to a next notification and for returning the detail area to a prior notification. At least one of a color or a shape of each visual indicator is controlled to indicate a type of a corresponding notification.

A further embodiment is a non-transitory computer readable medium embodying programmed instructions which, when executed by a processor, are operable for performing a method. The method includes receiving images of print media marked by a printer, generating notifications based upon the images, assigning the notifications to types based upon the images, and generating a Graphical User Interface (GUI) that presents the notifications via a display, wherein the GUI comprises a carousel that includes a detail area which presents a single notification at a time, a summary area that presents visual indicators that correspond with the notifications, and interactive elements for advancing the detail area to a next notification and for returning the detail area to a prior notification. At least one of a color or a shape of each visual indicator is controlled to indicate a type of a corresponding notification.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
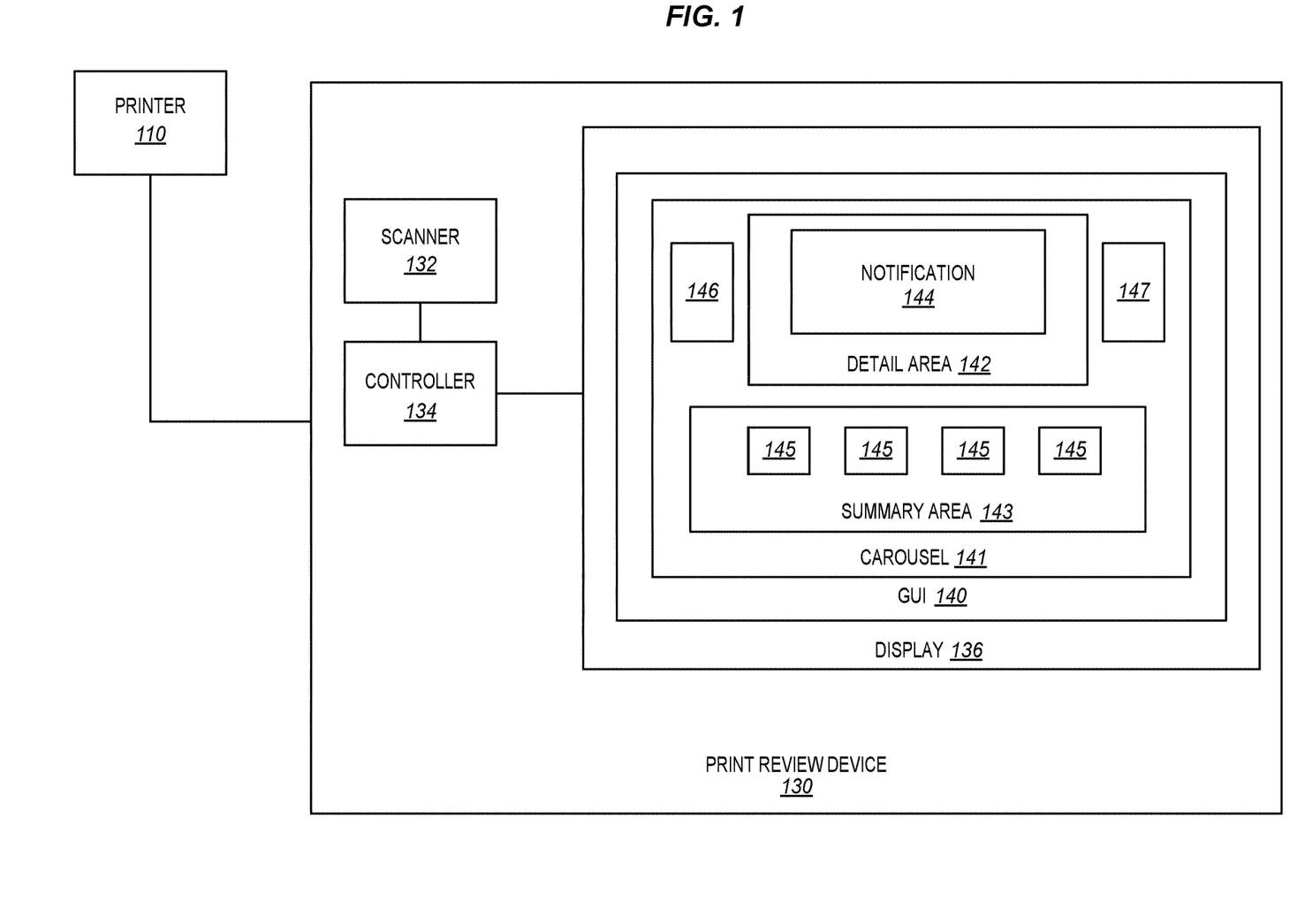
FIG. 1 is a block diagram of a print review system in an illustrative embodiment.

FIG. 1 is a block diagram of a print review system 100 in an illustrative embodiment. Print review system 100 comprises any system, device, or component operable to analyze images of print media that has been marked in accordance with print data in a print job. In this embodiment, print review system 100 comprises a print review device 130 that operates a scanner 132 to generate images of print media marked by a printer 110, operates a controller 134 that determines notifications to provide based on the images of the print media, and a display 136 that presents the notifications to a user for review via a GUI 140.

Printer 110 comprises any system, device, or component operable to mark print media in accordance with received instructions in print data for a print job. In this embodiment, printer 110 comprises a continuous-forms printer that marks a web of print media which travels through the printer in a web direction (also referred to as a "process direction"). For example, printer 110 may include a print controller that directs the operations of an array of printheads at a marking engine of the printer 110. The printheads then operate nozzles to eject ink onto the print media in accordance with instructions from the print controller as the print media advances.

Print review device 130 comprises any device capable of imaging and/or reviewing the printed output of printer 110. In this embodiment, print review device 130 is integrated into the printer 110. In further embodiments, print review device 130 is integrated with or coupled to a web of print media at a location that is downstream of the printer 110 with respect to a web direction along which the web proceeds. Scanner 132 acquires images of the print media after printing. Scanner 132 may periodically acquire images of the print media via a single camera or an array of cameras. In embodiments where an array of cameras is used, the scanner 132 may stitch images from the cameras together, in order to generate a composite image that extends across a width of the print media (i.e., a direction perpendicular to a process direction of the web of print media).

In one embodiment, scanner 132 scans the print media/acquires the images periodically and/or in real-time as the printer 110 continues printing/marking the print media and the print media advances. For example, scanner 132 may time acquisition of images such that the images depict each instance of a test pattern that is periodically printed by the printer 110 onto the print media (e.g., every page, every ten pages, every one hundred pages, etc.). In one embodiment, the resolution of images acquired by the scanner 132 is chosen such that each pixel in the image corresponds with a size equal to or less than that of a droplet of ink applied by a nozzle at a printhead.

The images acquired by the scanner 132 are analyzed by a controller 134. Controller 134 comprises any system, component, or device that characterizes images of a web of print media that has been marked by a printer 110. To perform this operation, controller 134 compares the images to target data that represents an ideal image of print media that has been marked exactly in accordance with the instructions for a print job. Controller 134 may be implemented as custom circuitry, as a hardware processor executing programmed instructions, etc.

Based on a comparison of the images of print media to the target data, controller 134 is capable of detecting and/or reporting notifications pertaining to the printer, print job, and/or print media. For example, controller 134 may detect the presence of defects or other conditions at a printhead of the printer 110, such as jet-outs (i.e., the condition of failing to apply ink to the print media), in accordance with the techniques described in U.S. patent application Ser. No. 16/712,985 filed on Dec. 12, 2019, entitled "ENHANCED PRINT DEFECT DETECTION," and herein incorporated by reference. In further embodiments, controller 134 may determine notifications such as low ink conditions based on a comparison of the images of the print media to the target data. In one embodiment, controller 134 additionally receives notifications from a controller of the printer 110, such as notifications that firmware updates are available. In one embodiment, controller 134 further categorizes notifications that have been detected. For example, controller 134 may assign notifications to types/categories comprising informational notifications, warning notifications, and error notifications, or firmware-related notifications, printhead-related notifications, and ink-related notifications.

Controller 134 generates a GUI 140 and directs display 136 to present the GUI 140 to a user. Display 136 comprises any suitable device for visually displaying digital information, and may comprise a monitor, projector, touchscreen, etc. The GUI 140 includes a carousel 141, which includes a detail area 142 and a summary area 143. The detail area 142 presents a single notification 144 at a time, while the summary area 143 includes visual indicators 145 which each represent a notification 144 available for display in the detail area 142. By selecting interactive elements 146 and 147 (e.g., arrows), a user may advance to prior or next notifications.

Unlike prior carousels, the visual indicators 145 at carousel 141 have each been enhanced to exhibit a distinct/unique combination of color and/or shape, based on the type of notification that they represent. That is, controller 132 has been enhanced to automatically control these aspects of the visual indicators 145 based on the types of notifications that they represent. Thus, a user viewing the carousel 141 need not utilize interactive elements 146 and 147 to cycle through every notification 144 in order to determine the types of notifications that are in the carousel. This enhances the ability of a print shop operator to ignore or bypass low priority notifications, without having to scroll through the entire carousel. Thus, a print shop operator reviewing the carousel may quickly determine the severity and type of issue encountered for a given print job, without needing to click through all items listed in the carousel. This beneficially saves both time and stress for operators of the print review device 130.

The particular arrangement, number, and configuration of components described herein is illustrative and non-limiting. Illustrative details of the operation of print review system 100 will be discussed with regard to FIG. 2. Assume, for this embodiment, that a printer 110 has received print data for a print job (e.g., Portable Document Format (PDF) data accompanied by a Job Definition Format (JDF) job ticket), and has initiated printing of the print job onto a web of print media. As the print media advances from the printer 110, it passes downstream into view of scanner 132.

Figure 2:
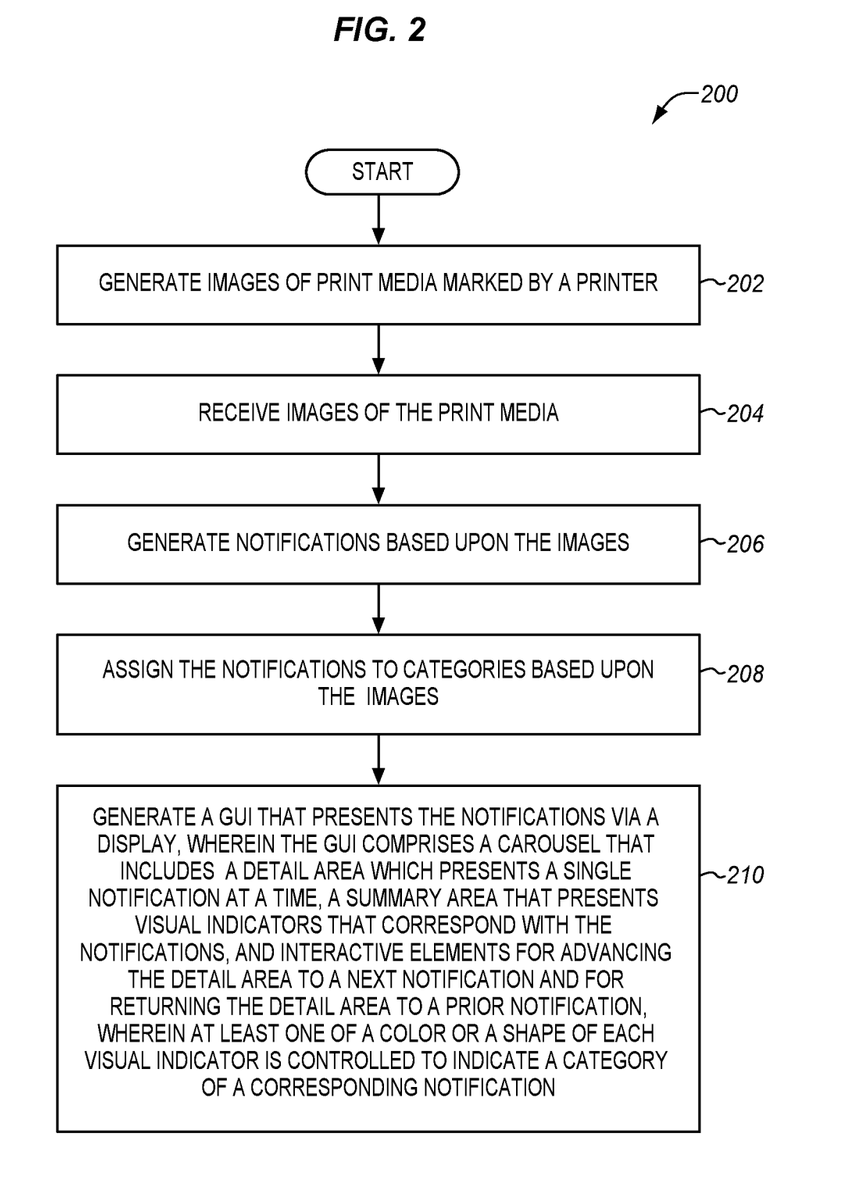
FIG. 2 is a flowchart illustrating a method for operating a print review system with a dynamically populated GUI in an illustrative embodiment.

FIG. 2 is a flowchart illustrating a method 200 for reporting notifications pertaining to scanned documents in an illustrative embodiment. The steps of method 200 are described with reference to print review system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, scanner 132 generates images of print media marked by the printer 110. The images may comprise static images (e.g., digital images in a format such as Joint Photographic Experts Group (JPEG), Graphics Interchange Format (GIF), Portable Network Graphics (PNG), etc.), frames of video footage, or other content. In one embodiment, scanner 132 generates the images in real-time as printing occurs at printer 110. In further embodiments, scanner 132 generates the images at the start of a print job, dynamically in response to detecting the start of a print job, the passage of a certain number of pages of content or a new test pattern, or in response to triggering instructions from a print controller of the printer 110. The images are acquired at a resolution that enables a quality of marked print media to accurately analyzed. For example, the images may be acquired at a resolution that equals the print quality of the current job (e.g., six hundred Dots Per Inch (DPI), twelve hundred DPI, etc.), or at a resolution such that at least one pixel exists to represent output from each nozzle at printheads of the printer 110.

In step 204, the controller 134 of the print review device 130 receives images of the print media. In one embodiment, the controller 134 is integrated into the print review device 130 and receives the images directly from the scanner 132, while in further embodiments the controller 134 is implemented remotely (e.g., at a print server that manages the print shop) and receives the images via a network or file system.

In step 206, the controller 134 generates notifications that are based upon the images. In one embodiment, this operation comprises reviewing test patterns depicted in the images, and comparing the test patterns to target data. If the test patterns do not match the target data at specific locations along a width of the print media, this may be indicative of an issue with a printhead or nozzle. Further analysis may be performed in accordance with the techniques discussed in U.S. patent application Ser. No. 16/712,985 in order to identify defects related to printing. Each defect may be associated with a specific notification and type of notification, based on the type of defect identified. In addition to generating notifications based on the images, the controller 134 may further generate notifications based on input from the printer 110, and/or from a print server that manages the operations of the printer. Thus, the controller 134 may consider the inclusion of additional notifications that are not directly based upon the images themselves.

In step 208, the controller 134 assigns the notifications to types based upon the images. Notifications may be assigned types based on the source that provided the notifications (e.g., the images, the printer, a print server, etc.), based on the perceived importance of the notifications (e.g., errors, warnings and informational content), or based on other criteria (e.g., the type of defect detected, as discussed above). In this embodiment, the controller 134 assigns the notifications to types based upon the images by determining a type of discrepancy between test patterns and target data for notifications. For example, if a test pattern shows no ink applied from a nozzle that should be applying ink, this may qualify as a jetout error. However, if less ink than desired is being applied from a nozzle, this may qualify as a jetout warning. Various thresholds for categorization may be prepared in accordance with the techniques discussed in U.S. patent application Ser. No. 16/712,985, based on the location and type of printing defects detected.

In step 210, the controller 134 generates a GUI 140 that presents the notifications via the display 136. The GUI 140 comprises a carousel 141 that includes a detail area 142 which presents a single notification 144 at a time, a summary area 143 that presents visual indicators 145 that correspond with the notifications, and interactive elements 146 and 147 for advancing the detail area to a next notification and for returning the detail area 142 to a prior notification. The colors and/or shapes of each visual indicator 145 are controlled to indicate a type of a corresponding notification. By presenting notifications via a carousel in this manner, a print shop operator may quickly review the summary area to determine the importance of notifications in the carousel, without having to scroll to each item in the carousel. This provides a technical benefit by rapidly providing relevant information to print shop operators without the need for a large number of clicks.

In a further embodiment, controller 134 is configured to generate the notifications and the GUI 140 in real-time as the printer 110 marks the print media. The notifications are generated based on input from scanner 132 as the scanner 132 scans the print media in real-time and the printer 110 marks the print media. Performing these operations in real-time provides a technical benefit by enabling a print shop operator to immediately identify and rectify issues that may impact print quality for a print job.

Figure 3:
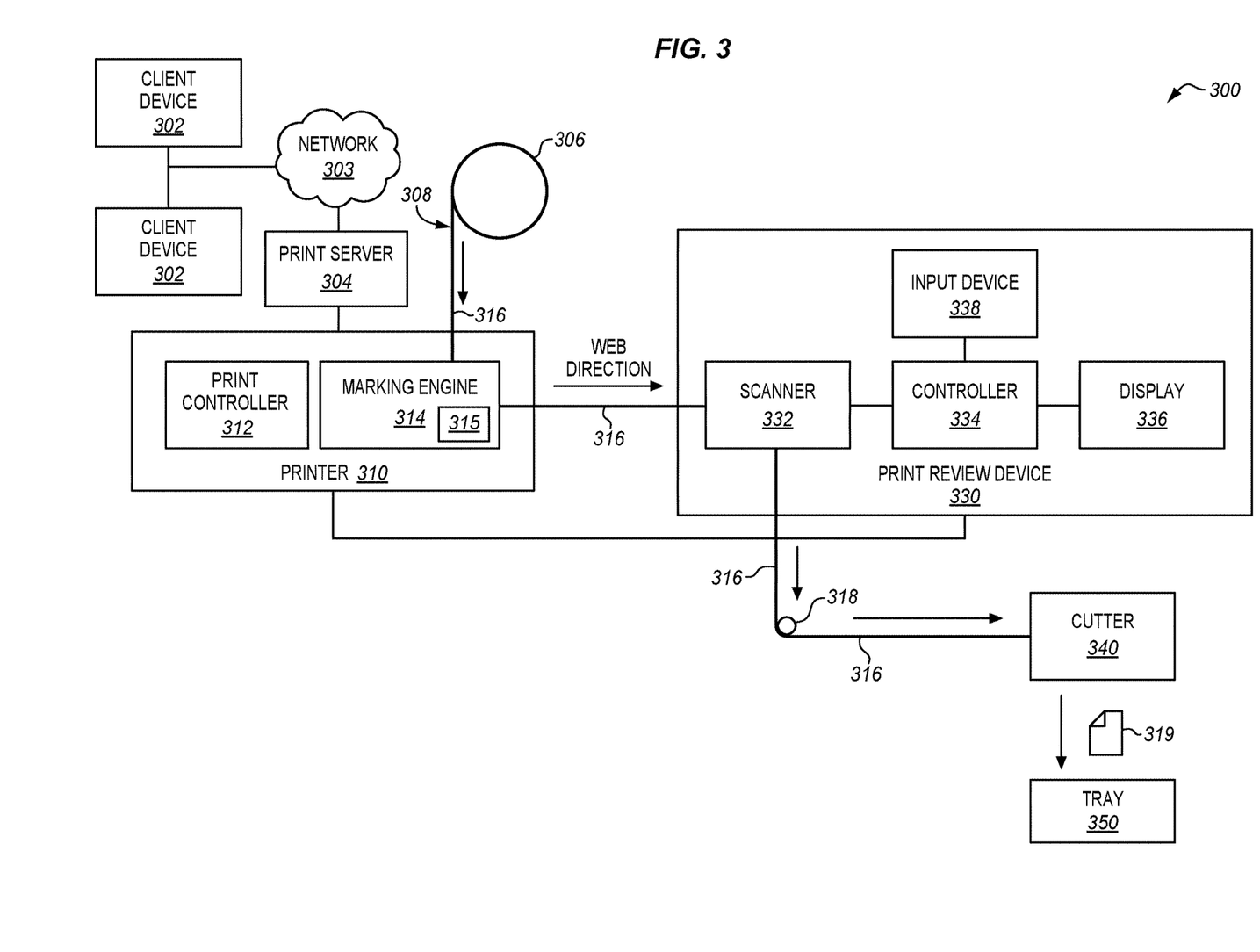
FIG. 3 is a block diagram of a print shop in an illustrative embodiment.

FIG. 3 is a block diagram of a print shop 300 in an illustrative embodiment. Specifically, FIG. 3 illustrates a print shop environment in which print media may be reviewed. According to FIG. 3, a print server 304 at the print shop 300 receives print jobs from one or more client devices 302 (e.g., via a network 303 such as the Internet). The print jobs may comprise print data accompanied by a job ticket. The print server 304 schedules the print jobs for printing at one or more printers 310. To initiate printing of an individual print job, print server 304 transmits the print job to a printer 310. A print controller 312 at the printer 310 processes (e.g., rasterizes) the print data for the job in accordance with a job ticket for the print job, and generates instructions for a marking engine 314 at the printer 310. The marking engine 314 receives a web 316 of print media 308 from a spool 306, and marks the web 316 using printheads 315 which apply ink, a marking fluid, etc. to the web 316. Portions of the web 316 that have been marked advance downstream in a web direction to print review device 330. As these portions of the web 316 pass by scanner 332, the scanner 332 acquires images of the web 316. These images may be acquired each time a test pattern is recognized, periodically as new test patterns pass the scanner 332, or continuously in real-time. The portions of the web 316 advance to a cutter 340, via roller 318. The cutter 340 cuts the portions into pages 319 for stacking into a tray 350.

Images acquired via scanner 332 are accessed by controller 334, which reviews the images in order to detect notifications related to the printing process. In this embodiment, controller 334 is coupled for communication with print controller 312 of printer 310, and/or print server 304. In such an embodiment, the controller 334 is configured to detect additional notifications based on communications with a print controller 312 of the printer, and include the additional notifications in a GUI. Examples of such notifications include a status of the printer 310 itself (e.g., pertaining to the existence of needed firmware upgrades, paper jam issues, etc.). In this embodiment, scanner 332 also provides notifications that are not directly related to the print job. For example, scanner 332 may report that a camera at the scanner 332 has stopped functioning, that the scanner 332 was unable to locate a test pattern on the web 316, etc.

In one embodiment, controller 334 combines the various received notifications together for presentation at a GUI via display 336. Controller 334 arranges the notifications at a carousel in the GUI based on the types for the notifications. For example, controller 334 may actively arrange notifications in a carousel of the GUI such that notifications in the same type are grouped together. The notifications may then be reviewed via input device 338 (e.g., a keyboard and mouse, custom set of input buttons, touchscreen, etc.).

Figure 4:
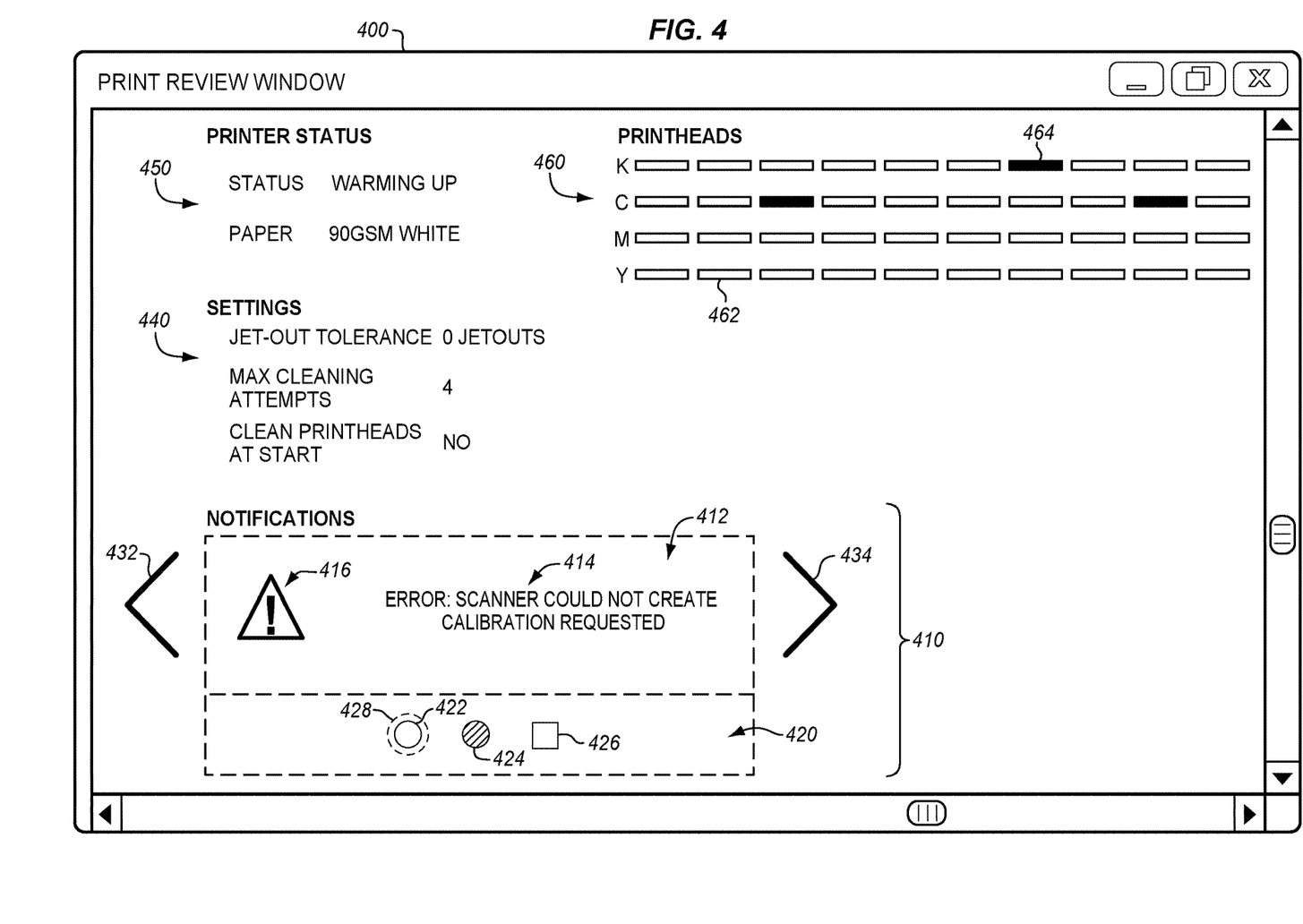
FIGS. 4-6 depict dynamically populated GUIs in an illustrative embodiment.
Figure 5:
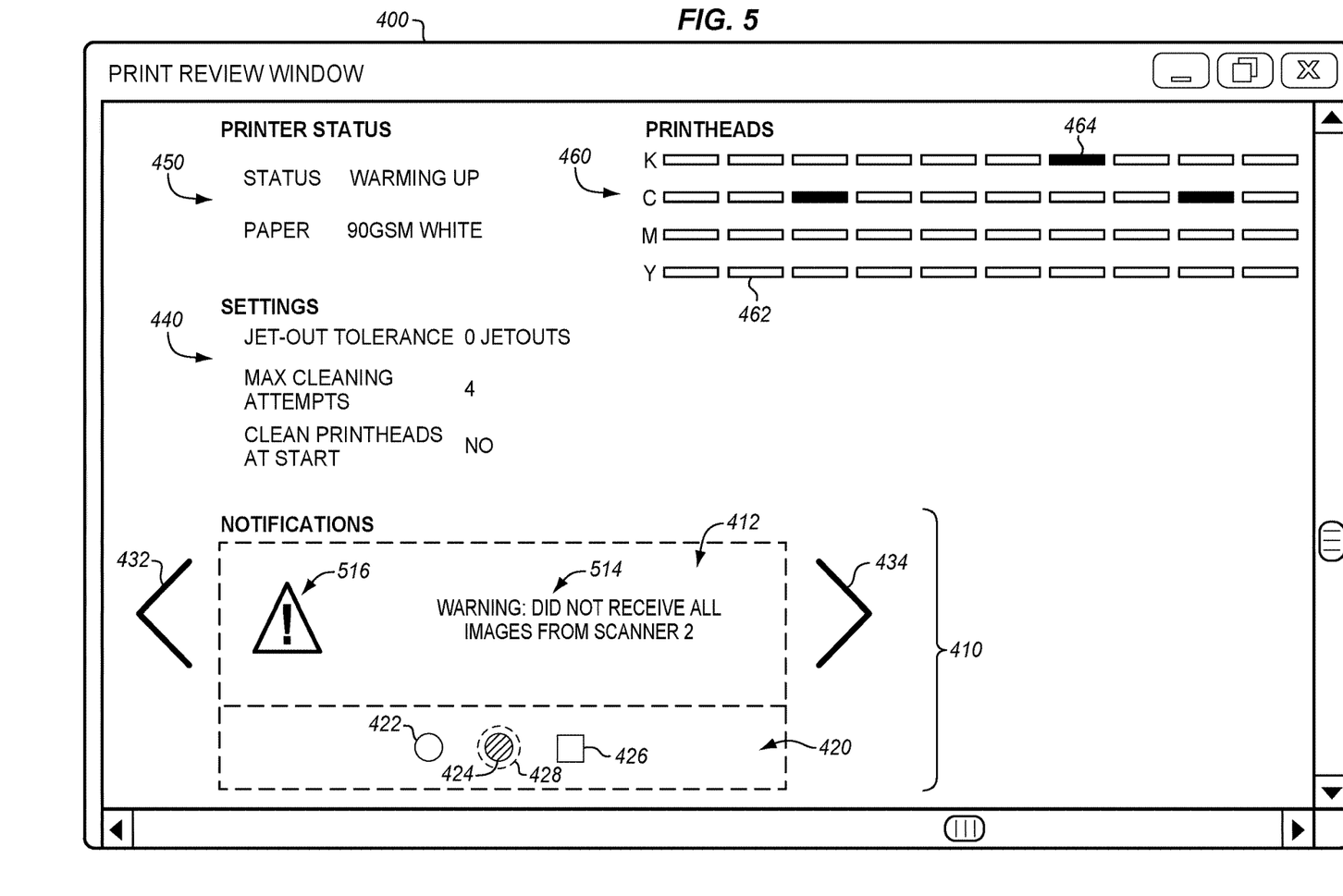
Figure 6:
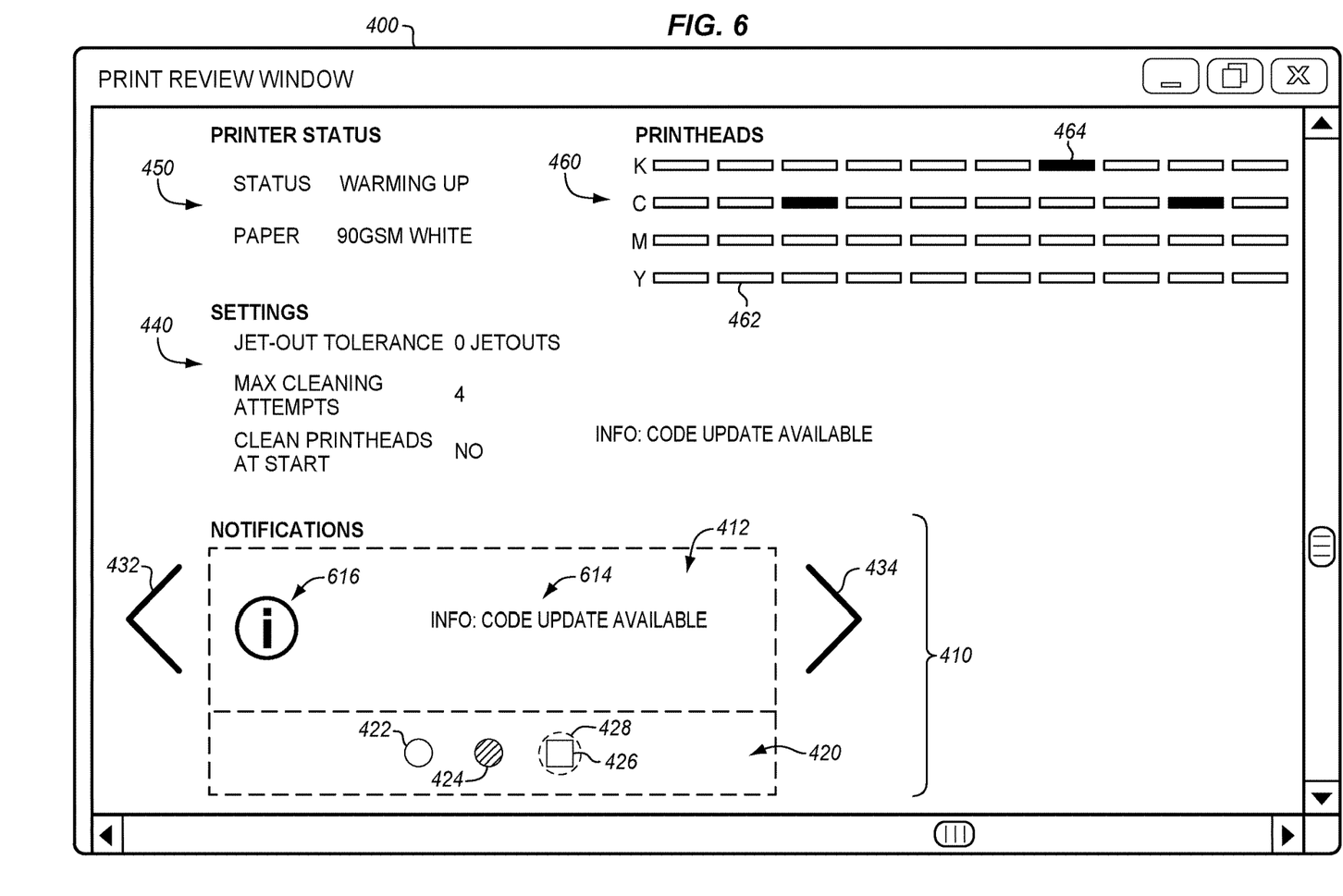

FIGS. 4-6 depict dynamically populated GUIs that include enhanced carousels in an illustrative embodiment. In the embodiment shown in FIG. 4, a GUI 400 is formatted according to Hypertext Markup Language (HTML) in combination with Cascading Style Sheet (CSS) data in order to present a variety of elements reporting the status of a print job. For the purposes of this embodiment, the primary GUI element comprises carousel 410. Carousel 410 comprises a detail area 412 in which one notification 414 is displayed at a time, as well as a summary area 420 that includes visual indicators 422, 424, and 426. Each visual indicator corresponds with a specific notification included in the carousel 410 by a controller. Thus, the number of visual indicators in the carousel 410 varies depending on the number of notifications. The visual indicators 422, 424, and 426 are shaped (e.g., into circles, squares, triangles, stars, etc.) and/or colored based on the type of the notifications that they represent. Thus, one combination of shape and color may be assigned to a warning type another combination to an error type, and yet another to an informational type. In further embodiments, types are assigned based on the source of a notification (e.g., review of images from the scanner, input from print controller 312, input from print server 304, etc.).

In this embodiment, controller 334 is configured to include a colored icon 416 in the detail area 412 for a notification 414. Each colored icon 416 corresponds with a type of the notification that it accompanies, and is presented in a color that matches a color of a visual indicator for the notification. In this instance, colored icon 416 is colored red, as is visual indicator 422. The colored icons 416 themselves may be stored in a memory at the controller and associated with each type, in order to enable quick retrieval of the colored icons 416 for presentation at a display.

The visual indicators 422, 424, and 426 each correspond with a specific notification, and are shaped and/or colored based on the type of the notification that they represent. Thus, the number, and shape/size of the visual indicators varies depending on the number of notifications and their corresponding types. A selection indicator 428 surrounds the visual indicator 422 for the notification 414 that is presently being displayed.

The carousel further includes interactive elements 432 and 434 for viewing a prior notification and a next notification in the detail area, respectively. Thus, by clicking on interactive element 434, the carousel advances to depict a next notification as shown in FIG. 5.

The elements of the GUI further include a printer status section 450, which reports the current status of a printer 310 as indicated by a print controller 312 of the printer 310, or a print server 304. A settings section 440 indicates settings for the print review device 330. The settings section 440 includes an indication of a number of tolerated jet-outs allowed at printheads of the printer 310 before an error is indicated or printing is halted. The settings section 440 also indicates a maximum number of cleaning attempts to perform on a printhead before reporting a jetout issue, and whether or not printheads are cleaned prior to the start of a print job.

The GUI further includes a printhead status section 460. This section indicates, on a printhead-by-printhead basis (or in some embodiments, a nozzle-by-nozzle basis), the location of printheads that are experiencing jetout conditions. In this embodiment, fully operational printheads are indicated with symbols 462, while printheads experiencing a jetout are indicated with symbols 464. This allows a technician at the print shop to rapidly locate the positions of printheads and/or nozzles that are experiencing issues.

FIG. 5 illustrates GUI 400 after a user has advanced the carousel 410 to a next notification via interactive element 434. In this embodiment, the notification 514 is presented in the detail area 412, along with an accompanying icon that indicates a type for the notification 514. Visual indicator 424 corresponds with the notification, and colored icon 516 is colored orange to match the color of visual indicator 424. Selection indicator 428 has been moved to surround visual indicator 424.

FIG. 6 illustrates GUI 400 after a user has advanced the carousel 410 to a next notification. In this embodiment, the notification 614 is presented in the detail area 412, along with an accompanying icon that indicates a type for the notification 614. Visual indicator 426 corresponds with the notification, and colored icon 616 is colored blue to match the color of visual indicator 426. Selection indicator 428 has been moved to surround visual indicator 424.

Examples

Figure 7:
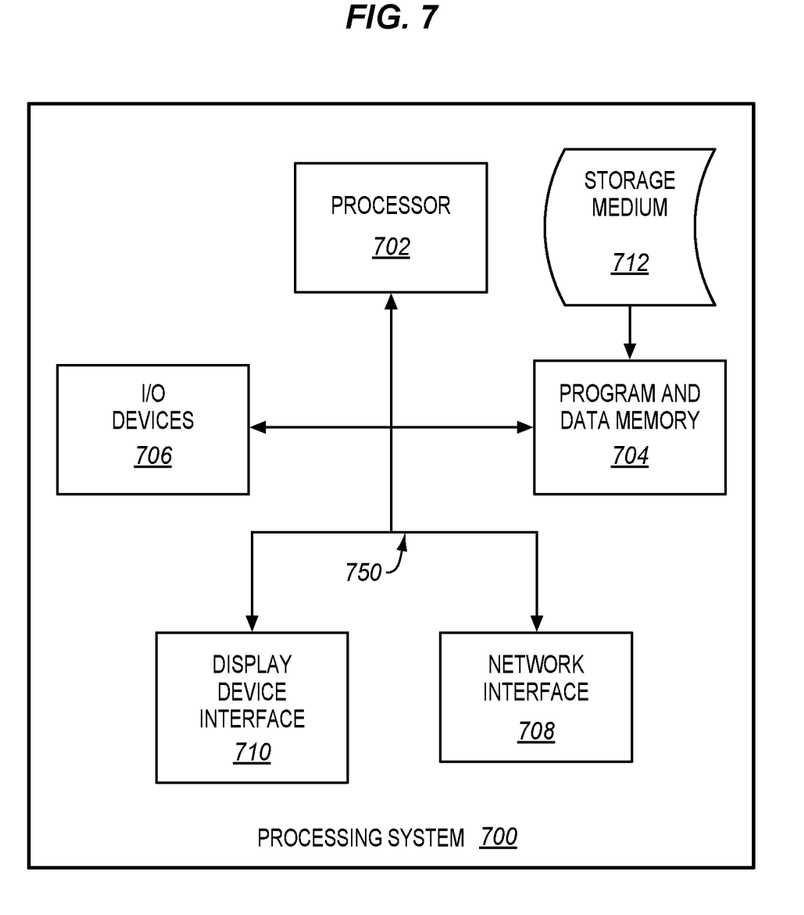
FIG. 7 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print review device 130 or print review device 330 to perform the various operations disclosed herein. FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A system comprising:
an image review device comprising:
a display;
an interface that is configured to receive images of print media marked by a printer; and
a controller configured to generate notifications based upon the images, assign the notifications to types based upon the images, and generate a Graphical User Interface (GUI) that presents the notifications via the display, wherein the GUI comprises a carousel that includes a detail area which presents a single notification at a time, a summary area that presents visual indicators that correspond with the notifications, and interactive elements for advancing the detail area to a next notification and for returning the detail area to a prior notification,
wherein the controller is configured to automatically control at least one of a color or a shape of each visual indicator to indicate a type of a corresponding notification.

2. The system of claim 1 wherein:
the controller is configured to arrange the notifications at the GUI based on the types for the notifications.

3. The system of claim 1 wherein:
visual indicators for each type are assigned a unique combination of color and shape.

4. The system of claim 1 wherein:
the controller is configured to generate the notifications and the GUI in real-time as the printer marks the print media, based on input from a scanner that scans the print media in real-time as the printer marks the print media.

5. The system of claim 1 wherein:
the controller is configured to include a colored icon in the detail area for a notification, wherein the colored icon corresponds with a type of the notification, and is presented in a color that matches a color of a visual indicator for the notification.

6. The system of claim 1 wherein:
the controller is configured to detect additional notifications based on communications with a print controller of the printer, and include the additional notifications in the GUI.

7. The system of claim 1 wherein:
the types comprise informational notifications, warning notifications, and error notifications.

8. A method comprising:
receiving images of print media marked by a printer;
generating notifications based upon the images;
assigning the notifications to types based upon the images;
generating a Graphical User Interface (GUI) that presents the notifications via a display, wherein the GUI comprises a carousel that includes a detail area which presents a single notification at a time, a summary area that presents visual indicators that correspond with the notifications, and interactive elements for advancing the detail area to a next notification and for returning the detail area to a prior notification; and
wherein at least one of a color or a shape of each visual indicator is controlled to indicate a type of a corresponding notification.

9. The method of claim 8 further comprising:
arranging the notifications at the GUI based on the types for the notifications.

10. The method of claim 8 wherein:
visual indicators for each type are assigned a unique combination of color and shape.

11. The method of claim 8 wherein:
the method is performed in real-time as a printer marks the print media.

12. The method of claim 8 further comprising:
including a colored icon in the detail area for a notification, wherein the colored icon corresponds with a type of the notification, and is presented in a color that matches a color of a visual indicator for the notification.

13. The method of claim 8 further comprising:
detecting additional notifications based on communications with a print controller of the printer; and
including the additional notifications in the GUI.

14. The method of claim 8 wherein:
the types comprise informational notifications, warning notifications, and error notifications.

15. A non-transitory computer readable medium embodying programmed instructions which, when executed by a processor, are operable for performing a method comprising:
receiving images of print media marked by a printer;
generating notifications based upon the images;
assigning the notifications to types based upon the images;
generating a Graphical User Interface (GUI) that presents the notifications via a display, wherein the GUI comprises a carousel that includes a detail area which presents a single notification at a time, a summary area that presents visual indicators that correspond with the notifications, and interactive elements for advancing the detail area to a next notification and for returning the detail area to a prior notification; and
wherein at least one of a color or a shape of each visual indicator is controlled to indicate a type of a corresponding notification.

16. The non-transitory computer readable medium of claim 15 wherein the method further comprises:
arranging the notifications at the GUI based on the types for the notifications.

17. The non-transitory computer readable medium of claim 15 wherein:
visual indicators for each type are assigned a unique combination of color and shape.

18. The non-transitory computer readable medium of claim 15 wherein:
the method is performed in real-time as a printer marks the print media.

19. The non-transitory computer readable medium of claim 15 wherein the method further comprises:
  including a colored icon in the detail area for a notification, wherein the colored icon corresponds with a type of the notification, and is presented in a color that matches a color of a visual indicator for the notification.

20. The non-transitory computer readable medium of claim 15 wherein the method further comprises:
  detecting additional notifications based on communications with a print controller of the printer; and
  including the additional notifications in the GUI.

\* \* \* \* \*